Dec. 2, 1958 R. G. HOLMES 2,862,996
STRAIN RELIEF DEVICE
Filed March 27, 1956
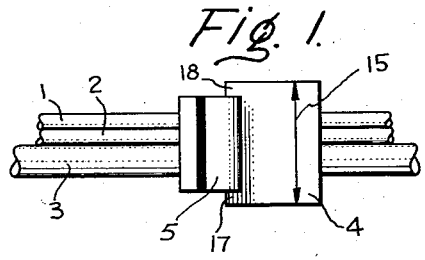
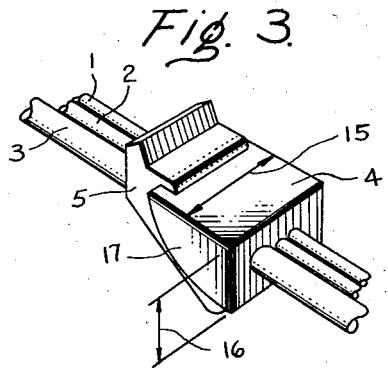
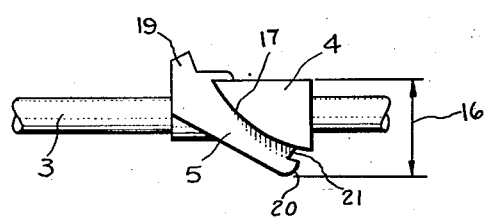
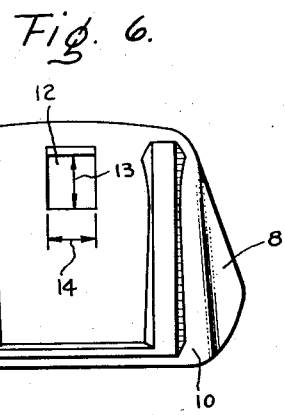
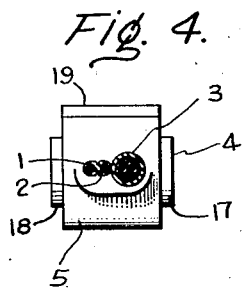
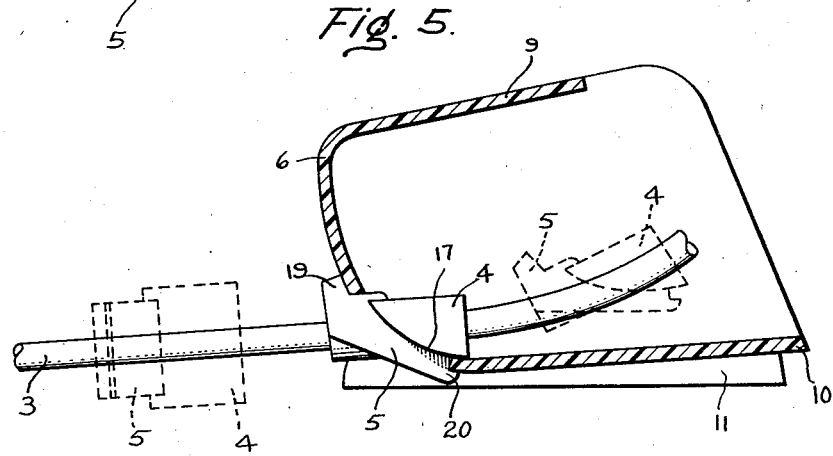
Inventor:
Robert G. Holmes
by Lawrence L. Kempton
His Attorney

United States Patent Office 2,862,996
Patented Dec. 2, 1958

2,862,996

STRAIN RELIEF DEVICE

Robert G. Holmes, Asheboro, N. C., assignor to General Electric Company, a corporation of New York Application March 27, 1956, Serial No. 574,141

7 Claims. (Cl. 174—135)

This invention relates to strain relief devices, of a type particularly suitable for securing an electrical conductor or power supply cord to an appliance.

In connection with electrical devices having a power supply cord associated therewith, it is important that a means be provided for securing the electrical supply cord to the housing in such a manner that mechanical stress on the electrical connections within the device is eliminated and prevented.

One of the primary objects of this invention is to provide an improved strain relief device to be attached to a cord, such as an electrical supply line, for securing the cord to a housing with a connection which transfers stress in any direction from the cord directly to the housing.

A further object of this invention is to arrange a strain relief device which is readily assembled to the associated housing, but which when assembled provides a secure attachment, regardless of any stress which may be subsequently applied to the cord itself.

Another object of this invention is to provide a strain relief device for an appliance which blends in with the outline of the housing for the appliance.

Briefly stated, in accordance with one aspect of this invention, a strain relief means for securing an electrical supply cord to a housing is arranged for engagement in an elongated aperture in the housing. The strain relief device, securely attached to the cord, includes an inside body portion and an outside body portion, both of which are dimensioned to pass through the aperture when properly oriented with regard to the elongated shape of the opening. The inside body portion, however, prevents withdrawal of the cord and strain relief device after rotation thereof to an angular position with respect to the elongated aperture. The outside body portion of the strain relief device includes flanges engageable with the outside wall of the housing, thereby to securely attach the strain relief means to the housing.

While the specification concludes with claims particularly pointing out and distinctly claiming the subject matter which I regard as my invention, it is believed the invention will be better understood from the following description taken in connection with the accompanying drawings, in which:

Fig. 1 is a plan view of a strain relief device assembled to a cord in accordance with this invention;

Fig. 2 is a side elevation of the device shown by Fig. 1;

Fig. 3 is a perspective view of the strain relief device assembled to a cord;

Fig. 4 is an end elevation of the device as shown by Figs. 1 and 2, with a cross section through the cord;

Fig. 5 is a cross-sectional view through a portion of a housing for an electrical appliance, illustrating the method of assembly of the strain relief device to the housing; and Fig. 6 is a perspective view of the housing to illustrate the aperture in which the strain relief device is mounted.

Referring to the drawings, I have shown my invention as a strain relief device associated with an electrical appliance, although obviously, this invention is not necessarily limited to this particular application. A strain relief device as disclosed herein might be used with various types of lines or cords; but by way of example, I have shown in this application an electrical supply cord including insulated power supply conductors 1 and 2 and a control cord 3. The strain relief device itself, although an integral unit, includes first and second body portions 4 and 5 which, for the purposes of this description are referred to as inside and outside body portions respectively. Obviously, however, these body portions could be reversed in position with respect to the housing of the appliance.

Referring now to Figs. 5 and 6, a portion of a typical housing for an electrical appliance is shown. For example, this housing 6 may be the control unit for an electric blanket or heating pad. The housing may include the usual sidewalls 7 and 8, a top wall 9, and a bottom wall 10. In this particular embodiment, a base 11 has been molded integrally with bottom wall 10 to provide a support for the appliance. An elongated aperture 12 is arranged in one of the walls of housing 6, and in the present instance, this aperture has been shown as located in the curved transition area between bottom wall 10 and a side wall. Particular attention is directed at this point to the fact that aperture 12 is elongated, in the sense that it includes a major or long dimension 13 and a minor or short dimension 14. In the present embodiment, this aperture has been shown as generally rectangular in configuration, although obviously, other shapes for the elongated aperture may be selected, insofar as the selected shape corresponds with the selected shape for the strain relief device in a manner now to be described.

The strain relief device preferably is molded in position on the electrical cord. While other arrangements might be used for attaching or securing the strain relief device to the cord, modern molding techniques may be utilized effectively to form the entire device including both body portions 4 and 5 directly onto the electrical conductors, with a bond between the strain relief device and the insulation covering the conductors. With respect to the shape of the strain relief device, it may be noted that the inside body portion includes a long dimension 15 which is very slightly less than long dimension 13 in the housing; and similarly, the strain relief device in its entirety includes a minor or short dimension 16 which is slightly less than minor dimension 14 for the housing aperture. This is an important feature of the present construction in that it allows the electrical supply cord and assembled strain relief device to be assembled to the appliance by insertion of the strain relief device through the housing aperture from the outside of the housing. In other words, the entire electrical appliance may be assembled prior to the attachment to the housing of the strain relief device; and in any event, the strain relief device in accordance with this invention can be assembled to the housing from either direction.

Referring in particular to Figs. 1 through 4, it may be noted that the inside body portion is formed with a major dimension as defined by flanges 17 and 18. In the particular embodiment illustrated by the drawings, these flanges are curved to conform with the curvature of housing 6 with particular reference to the wall portions of the housing which define aperture 12. This invention is, of course, not limited to this particular curvature, since a strain relief device in accordance with the teaching of this invention could be applied to other surfaces, including planar surfaces.

Body portion 5 of the strain relief device is provided with flanges 19 and 20. In this instance, flanges 19 and 20 are adapted to be positioned against outside surfaces of the housing. In this connection, it may be noted that these flanges on the outside of the housing are disposed in angular relation with respect to the flanges 17 and 18 on the inside of the housing. In the particular embodiment illustrated, this angular relation is approximately 90°. Preferably, one of the flanges is formed to define a groove 21 between the flange itself and body portion 4 of the strain relief device. When groove 21 is engaged upon final assembly of the strain relief device with the housing, a firm securement results, capable of resisting stress applied to the cord in any direction without dislodging the strain relief device from the housing.

In assembly, utilizing a construction as above described, it may be noted that the strain relief device may be inserted through the aperture in the housing by orienting the long or major dimension 15 of the strain relief device with the long dimension 13 of the aperture. Thereupon, the supply cord and the strain relief device in its entirety may be inserted through aperture 12. Following insertion of the strain relief device through the aperture, the entire device, including the cord, is rotated to an angular position on the axis of the cord, whereupon withdrawal of the strain relief device from the housing is prevented by engagement of flanges 17 and 18 with inside wall portions of the housing. However, in view of the reduced cross section of body portion 5, it may extend outwardly through the aperture so that flange 19 thereof may be engaged with the outside wall of the housing. Final securement of the strain relief device to the housing is accomplished by engaging flange 20 of body portion 5 with the outside wall of the housing, with a portion of the housing wall defining aperture 12 lying in groove 21. This final securement may be accomplished, for example, by forming the strain relief device, or at least flange 20 thereof, from a deformable material. In this case, upward and outward tension applied to supply cord 3 from the outside of the housing is sufficient to complete the engagement.

When the engagement of the strain relief device to the housing has been completed as above described, it may be noted that any stress applied to the supply cord is transferred directly to the housing. For example, an outward stress is transferred from cord 3 to body portion 4 of the strain relief device and through flanges 17 and 18 to the housing. Similarly, an inward stress applied to cords 1, 2 and 3 is transferred to the strain relief device body portion 5 and flanges 19 and 20 to the housing. While the use of a deformable flange at 20 is preferred for ease of assembly and to provide a construction which completely fills the opening 12 in the housing, other arrangements might be used within the scope of this invention. Obviously, for example, the body of the strain relief device could be so formed that upon rotation thereof to its angular position for securement, the flange 20 could be engaged with the housing wall.

As clearly shown by Fig. 5, this particular strain relief device lends itself to an arrangement wherein the outer portion thereof blends with the contour of the housing. This may be of particular advantage in situations such as the illustrated embodiment where the space available for the strain relief device is limited and where, for appearance purposes, it is desirable that the strain relief device be as unobtrusive as possible. As explained above, the ease of assembly of this particular construction presents a particular advantage in that the device may be assembled entirely from outside of the appliance. Hence, it is unnecessary to pass any appreciable length of wire through the aperture. Also, the electrical cord is positively secured to the appliance housing in manner transferring all stress from the cord to the housing without stress on internal electrical connections.

While this invention has been described by reference to a particular embodiment thereof, it is to be understood that numerous modifications may be made by those skilled in the art without actually departing from the invention. It is, therefore, the aim in the appended claims to cover all such equivalent variations as come within the true spirit and scope of the foregoing disclosure.

What I claim as new and desire to secure by Letters Patent of the United States is:

1. Strain relief means for anchoring an electric cord to a housing comprising means defining an elongated aperture in the housing having a long dimension and a short dimension, a strain relief member secured on the conductor, said strain relief member including first and second body portions adapted to extend on opposite sides of the walls of said housing, flange means on each of said body portions engageable respectively with opposite sides of the walls of said housing, said body portions being dimensioned to pass through said aperture when oriented with the long dimension thereof corresponding with the long dimension of said aperture and to engage said flanges to anchor said body portions on opposite sides of the housing walls when disposed with respective long dimensions in angular relation, thereby to secure said strain relief device to the housing.

2. Strain relief means for anchoring an electric cord to a housing comprising means defining an aperture in the housing having a long dimension and a short dimension, a strain relief member molded on the cord, said member including first and second body portions adapted to extend from opposite sides of the walls of said housing, said body portions being dimensioned to pass freely through said aperture when oriented with the long dimensions thereof corresponding with the long dimension of said aperture, first flange means on one of said body portions arranged to engage one surface of the walls of said housing, and second flange means on the other body portion in angular relation with respect to said first flange means adapted to engage the opposite surface of the walls defining said housing.

3. A device as defined by claim 2 wherein said second flange means includes a deformable portion to facilitate engagement with said housing.

4. A strain relief device adapted to be molded in position on a cord and cooperable with a housing provided with an elongated opening, said strain relief device comprising a first body portion, means defining flanges on said first body portion adapted to engage a surface of walls defining the elongated opening in the housing, a second body portion having flange means thereon at substantially right angles to the flange means on said first body portion, said body portions being dimensioned to pass freely through said opening when oriented with the long dimension thereof corresponding with the long dimension of said opening, said flange means on said second body portion being engageable with an opposite surface of said walls of the housing, thereby to secure the device in position within the opening.

5. A strain relief device for securing a cord to a housing within an elongated opening formed in a wall of the housing comprising a first body portion having flange means thereon, and a second body portion having flange means thereon in angular relation to said flange means on said first body portion, said body portions being dimensioned to pass freely through said opening when oriented with the long dimension thereof corresponding with the long dimension of said opening, said respective flange means being spaced transversely by a distance substantially equal to the thickness of the housing walls at the opening therein, whereby said device may be secured to the housing by engagement of respective flange means with opposite sides of the housing wall.

6. In an electrical device including a housing and an electrical conductor extending into said housing, strain relief means for securing said conductor to the housing comprising means defining a rectangular aperture through a wall of said housing and having a long dimension and a short dimension, a strain relief device secured to said electrical conductor, said device having an inside body portion with laterally projecting shoulders thereon for transmitting outward tension on the conductor to the housing, the total lateral width across said shoulders exceeding the short dimension of said aperture and being less than the long dimension thereof, whereby said inside body portion may be inserted from outside said housing through said aperture and rotated substantially 90° on the axis of the conductor to engage said shoulders with the inside of the housing, an outside body portion forming part of said device being dimensioned to pass freely through said aperture when oriented with the long dimension thereof corresponding with the long dimension of said aperture, and flanges at opposite ends of the long dimension of said outside body portion, said flanges being engageable with outside walls of the housing thereby to secure said strain relief device to the housing.

7. A device as defined by claim 6, in which the outside body portion includes flanges, one of which is deformable to facilitate securement of the strain relief device to the housing.

References Cited in the file of this patent

UNITED STATES PATENTS

| | | |
|---|---|---|
| 2,313,321 | Carlson et al. | Mar. 9, 1943 |
| 2,420,826 | Irrgang | May 20, 1947 |
| 2,494,814 | Huth | Jan. 17, 1950 |